United States Patent [19]

Schaefer

[11] Patent Number: 4,486,260
[45] Date of Patent: Dec. 4, 1984

[54] FABRICATING MACHINE AND PROCESS

[75] Inventor: Claude W. Schaefer, Fort Lauderdale, Fla.

[73] Assignee: Atco Rubber Products, Inc., Fort Worth, Tex.

[21] Appl. No.: 342,437

[22] Filed: Jan. 25, 1982

Related U.S. Application Data

[63] Continuation-in-part of Ser. No. 202,161, Oct. 30, 1980, abandoned.

[51] Int. Cl.³ ............................ B31C 1/00; B31C 5/00
[52] U.S. Cl. .................................. 156/429; 156/143; 156/195; 156/580.1
[58] Field of Search ............................. 156/143–144, 156/195, 425, 428, 429–431, 73.1, 580.1, 580.2; 138/122, 129

[56] References Cited

U.S. PATENT DOCUMENTS

| | | | |
|---|---|---|---|
| 3,336,172 | 8/1967 | Hall et al. | 156/429 X |
| 4,104,097 | 8/1978 | Gregory et al. | 156/143 |
| 4,149,924 | 4/1979 | Grobard | 156/429 X |

FOREIGN PATENT DOCUMENTS 2443916  8/1980  France ........................... 156/143

Primary Examiner—David Simmons
Attorney, Agent, or Firm—Eugene F. Malin

[57] ABSTRACT

A semi-rigid collapsible air duct having helically biasing reinforcement element 24, enveloped between an inner skin and an outer skin with the reinforcement element in a uniform helical spacing enveloped by ultrasonic welds. The process for manufacturing the air duct includes feeding the inner duct wall skin onto a mandrel, feeding the helically biased reinforcement element onto the mandrel having a groove with a tighter helical shape over the inner duct wall skin, feeding the outer duct wall skin onto the mandrel over the reinforcement element, then passing that composite under an ultrasonic welder which welds the inner duct wall skin to the outer duct wall skin, enveloping one or more reinforcement elements in such a way as to leave the one or more reinforcement elements free to move within their respective envelopments to develope the maximum thrust to place the reinforcing elements in tension to prevent droop of the walls of the duct.

11 Claims, 16 Drawing Figures

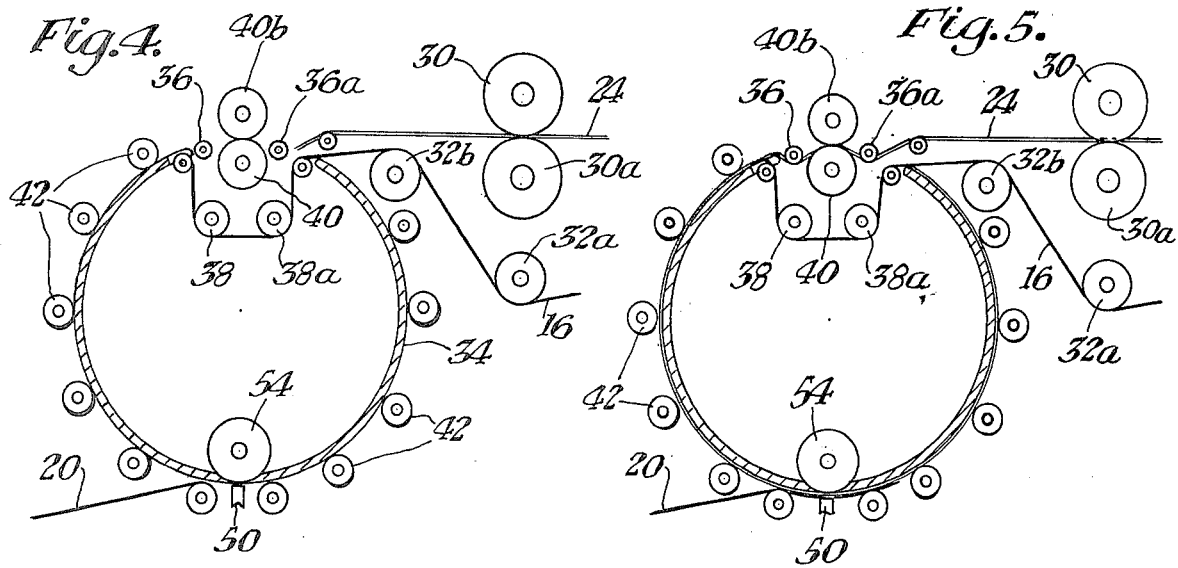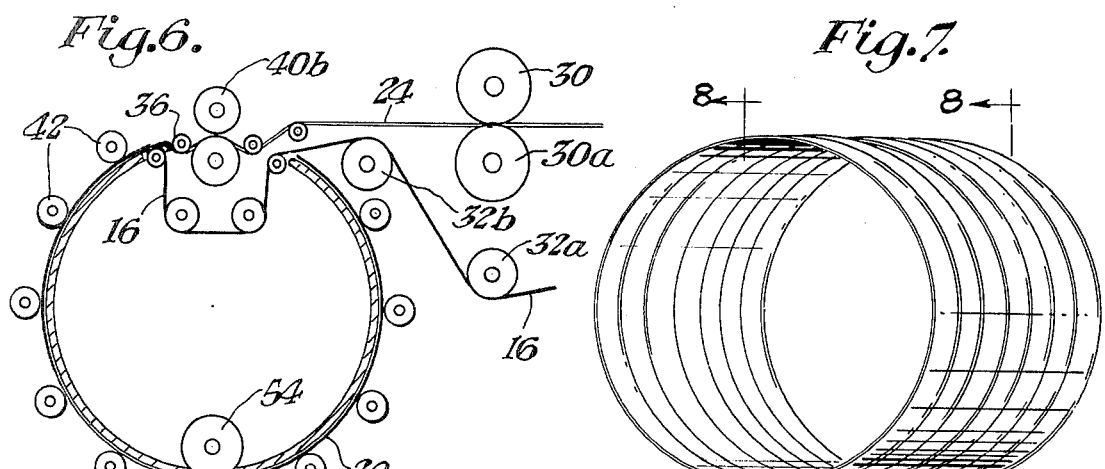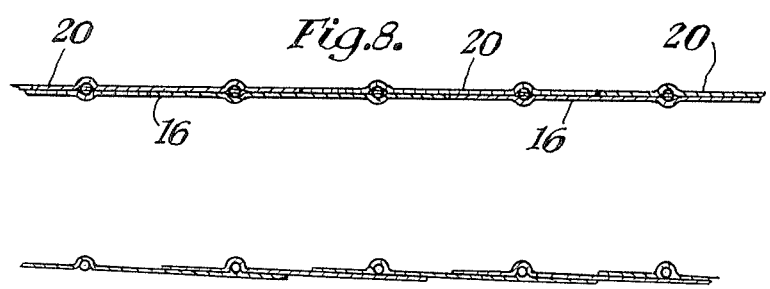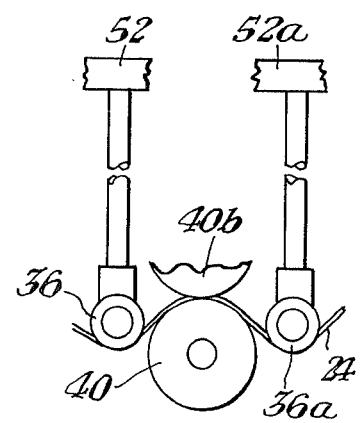

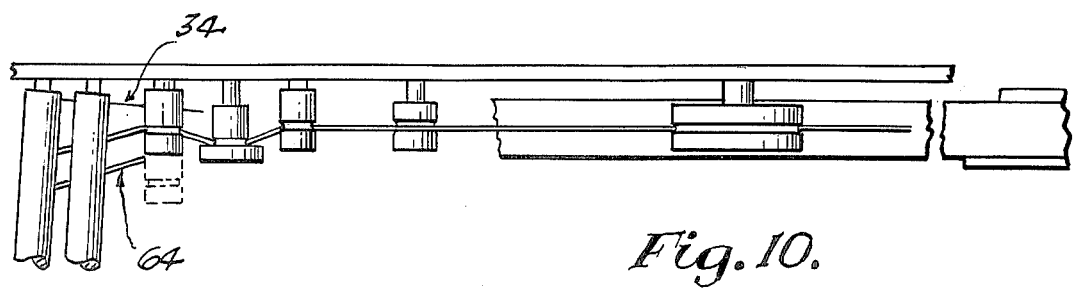
Fig. 10.
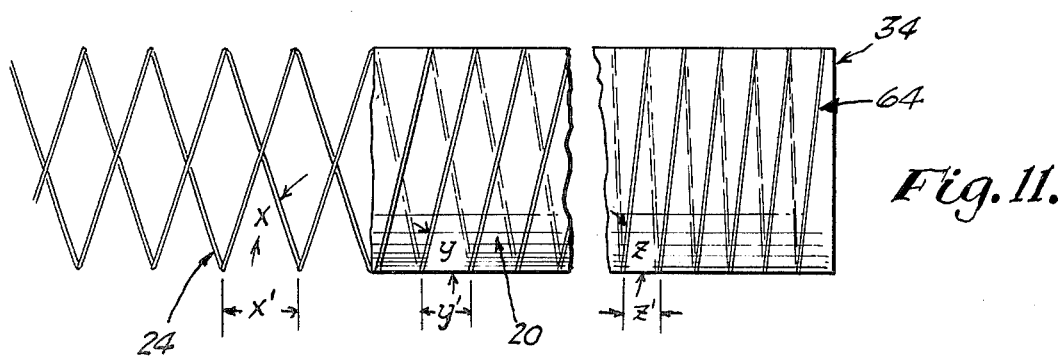
Fig. 11.
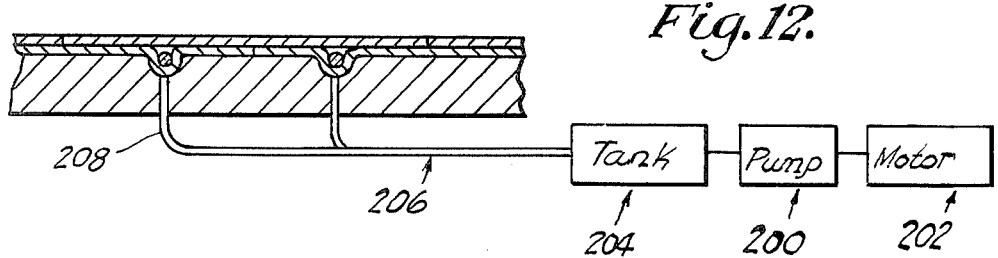
Fig. 12.
Fig. 14.
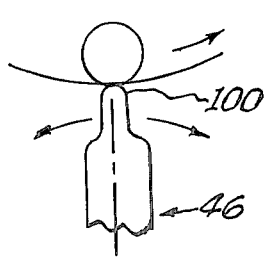
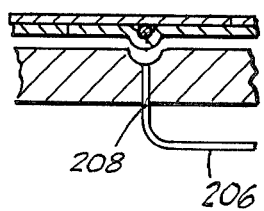
Fig. 13.
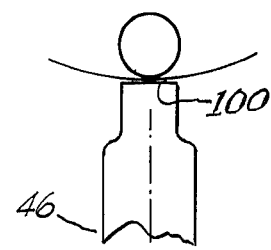
Fig. 15.

FABRICATING MACHINE AND PROCESS

This is a continuation-in-part to U.S. application Ser. No. 202,161, filed Oct. 30, 1980, abandoned, having title of Reinforced Duct Fabricating Machine and Process.

TECHNICAL FIELD

The present invention relates to a flexible duct, a flexible duct fabrication machine and process by which an inner strip is ultrasonically welded to an outer strip thereby enveloping a helical reinforcement element.

BACKGROUND ART

U.S. Pat. No. 3,554,237 discloses wire-reinforced flexible duct requiring an adhesive and or tape along the internal wall and along the external wall for retaining the wire reinforcement. The present invention employs ultrasonic welding in the fabrication process which welds the inner strip to the outer strip enveloping and retaining the helical wire reinforcement under compression to produce a strong semi rigid and fully extended duct that does not sag, and may be shipped in a collapsed state. The present invention eliminates the need for a separate adhesive means and extra fabrication equipment normally required to apply the adhesive means to the duct construction which produces a limpid duct which is costly to install and offers greater air resistance.

SUMMARY OF THE INVENTION

This is a new and improved duct, machine and process.

The duct keeps a semi rigid shape due to the coil or coils of wire being under compression when locked in the inner and outer skin by welding. Yet the skin and wire reinforcing allows the duct to be collapsed for shipment.

Reinforcement elements of any alloy, tempered or soft, plain or treated in any manner, or any other suitable material from one or more separate supply coils are used in the duct and are fed through an element straightener and then into an element former where a circular helical spiral angle greater than spiral spacing of the mandrel is impressed into the element by various means such as molecular excitation. Therefore, when the skin is attached to the element or wire and the skin is welded together, it holds the element or wire in compression to insure that the skin and duct is held in semi rigid shape.

The inner strip or skin is fed onto a helically grooved mandrel, the reinforcement element is placed over the inner strip. The element or elements are fed onto the mandrel through inner and outer driving rollers forcing the reinforcement element and a portion of the inner strip into or toward a respective groove, winding the inner strip and element helically about the mandrel. The element or wire is forced into compression in order to fit the helical groove in the mandrel which has grooves closer together than the set placed in the elements by the rollers.

After a predetermined distance of helical travel of the inner strip and the wire or element, the outer strip is fed onto the mandrel overlapping the reinforcement element and the wraps or strip of the adjacent inner strip. The outer strip is inserted in a manner which creates an overlap of the seams of the adjacent inner strips.

The strips can be made of any plastic, metal or composite material which can be ultrasonically welded. The reinforcement element commonly a wire may be of other materials such as plastic, glass or other suitable material to add proper strength to the product.

The reinforcement element, enveloped between the inner and outer strips passes through an ultrasonic welding device creating several rows of welds on both sides of the reinforcement element, joining the inner and outer strips, enveloping the reinforcement element and also welding the strips together at their edges. This welding process is necessary to produce a duct with said reinforcement shaped imposing a heavy tension on the welded skin of the duct that can be rapidly produced without time delay required for setting time required of adhesive processes.

As more of the reinforcement element and strip material is fed onto the mandrel a helically wound continuously welded duct is produced that holds the skin semi rigid and fully extended. Long lengths of duct can be produced rapidly. The mandrel momentarily holds the wire in its comprised condition so the skin may be welded and then the wire and skin is moved off the mandrel where the wire helix is allowed to expand a little to place the skin in tension. The mandrel includes pressurized fluid to force the wire and skin into a floating condition so that it may easily move off the mandrel and prevent sticking and slow production.

The present invention can produce 15 to 20 feet of duct per minute and is capable of greater speeds by relieving pressure of the skin and wire.

The fluid may be air, other gases or liquid. The fluids are under a preferred pressure of 75 to 100 p.s.i. Holes allow the fluid to move into the helical grooves in the mandrel.

BRIEF DESCRIPTION OF DRAWINGS

FIG. 4 is a partial front view of the invention showing the mandrel and the inner strip being fed through and then around the mandrel.

FIG. 5 is a partial front view of the invention with the mandrel showing the reinforcement element being fed into the driving rollers before contacting the inner strip.

FIG. 6 is a partial front view of the invention showing the mandrel with the reinforcement element and the inner strip being mated with the outer strip passing between a rotary anvil and the transducer welding horn.

FIG. 7 is a perspective view of the semi-rigid duct as it comes off the mandrel.

FIG. 8 is a cross-sectional view of the semi-rigid duct of FIG. 7 taken across the line 8 and looking in the direction of the arrows.

FIG. 8a is a cross-section of another embodiment of the duct of FIG. 7.

FIG. 9 is a partial front elevational view showing the adjustable reinforcement element forming guides.

FIG. 10 is a partial top view of FIG. 3.

FIG. 11 is an illustration of a duct partially with skin and partially without skin.

FIG. 12 is a partial view of the mandrel illustrating fluid channels and illustrating a pumping system.

FIG. 13 is a partial illustration of FIG. 12 with fluid holding the skin and wire in a floating position.

FIG. 14 is an enlarged illustration of the horn of the ultrasonic welder.

FIG. 15 is an enlarged illustration of another horn.

DESCRIPTION OF THE PREFERRED EMBODIMENTS

Figure 1:
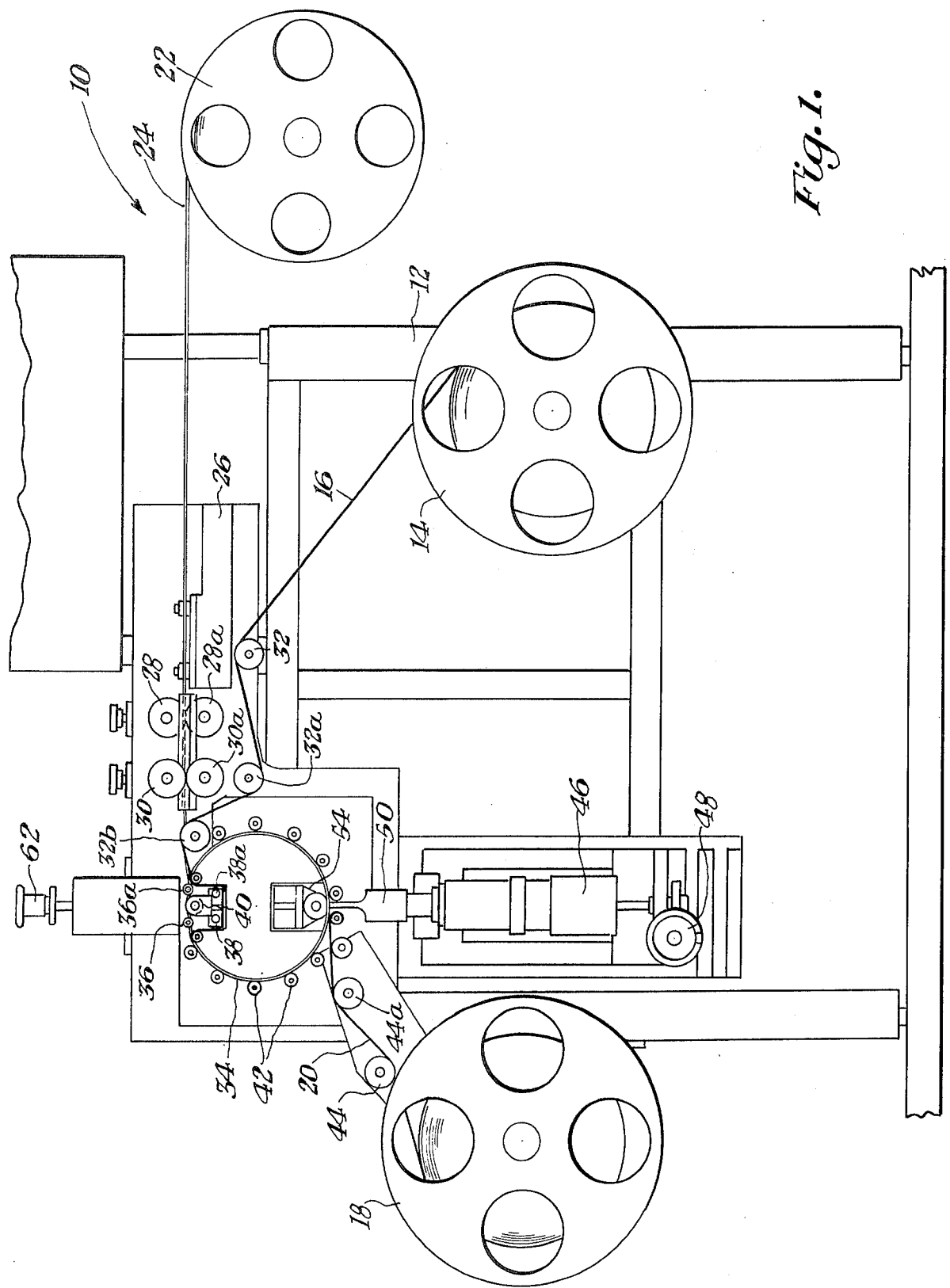
FIG. 1 is a front elevational view of the duct fabricating machine.

Referring now to the drawings and especially FIG. 1, the fabricating machine is generally shown at 10. The machine 10 is comprised of a frame 12, a first coil 14 of skin stripping 16, a second coil 18 of skin stripping 20, a mandrel 34, one or more wire coils 22, and an ultrasonic welding device 46. FIG. 7 illustrates the finished duct 80 in a semi rigid configuration with skin 16, wire 24 and skin 20. Elements or wires are free to move and to exert full compressed force while enveloped between inner and outer walls.

In order to operate the machine 10, wire or wires 24 are fed from the wire coil 22, preferably through a wire straightener 26 and through a respective set of wire drivers 28, 28a, 30 and 30a, wire forming rollers 36, 36a and to the combination driving and forming device 40. The wire drivers are shown by numbers 30 and 30a which are adjustable vertically and laterally to form the wire reinforcing elements so as to impart a helical and horizontally form to the element or a radial and lateral thrust (for spring effect) to elements at a greater helical angle than the helical grooved mandrel. To provide radial and horizontal tension to the skin of the duct more wire drivers are required such as 30 and 30a, equal to the number of wires used.

Figure 2:
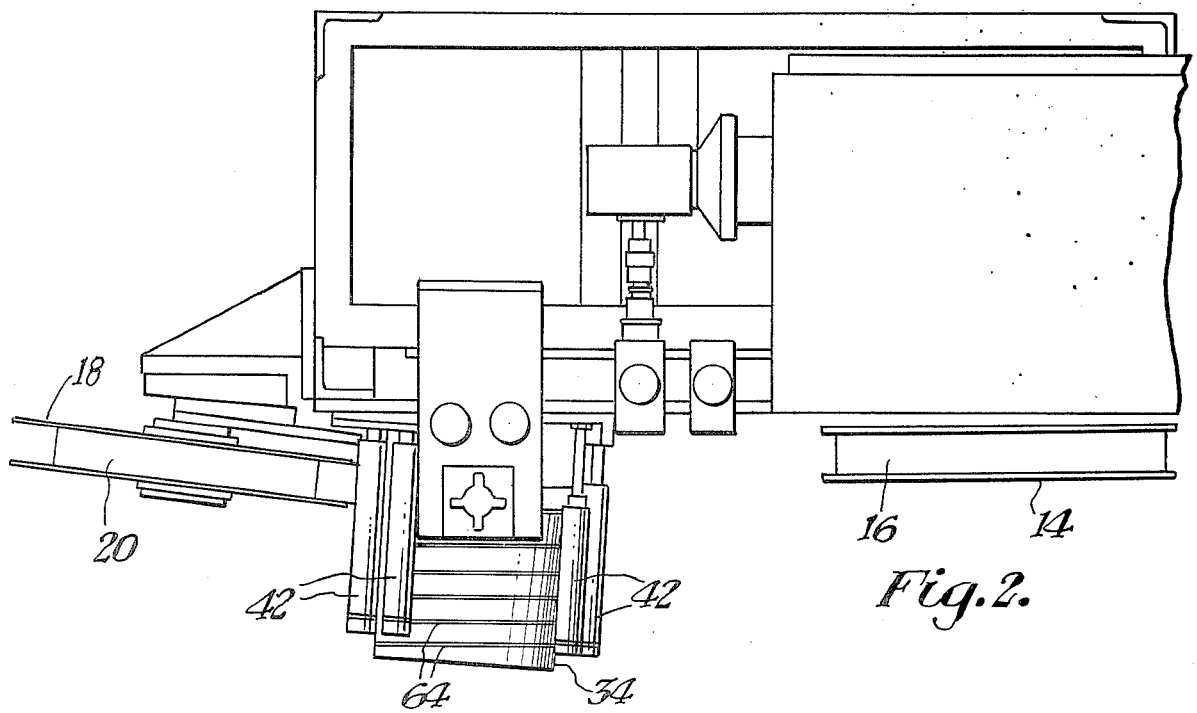
FIG. 2 is a partial top elevational view of the invention.
Figure 3:
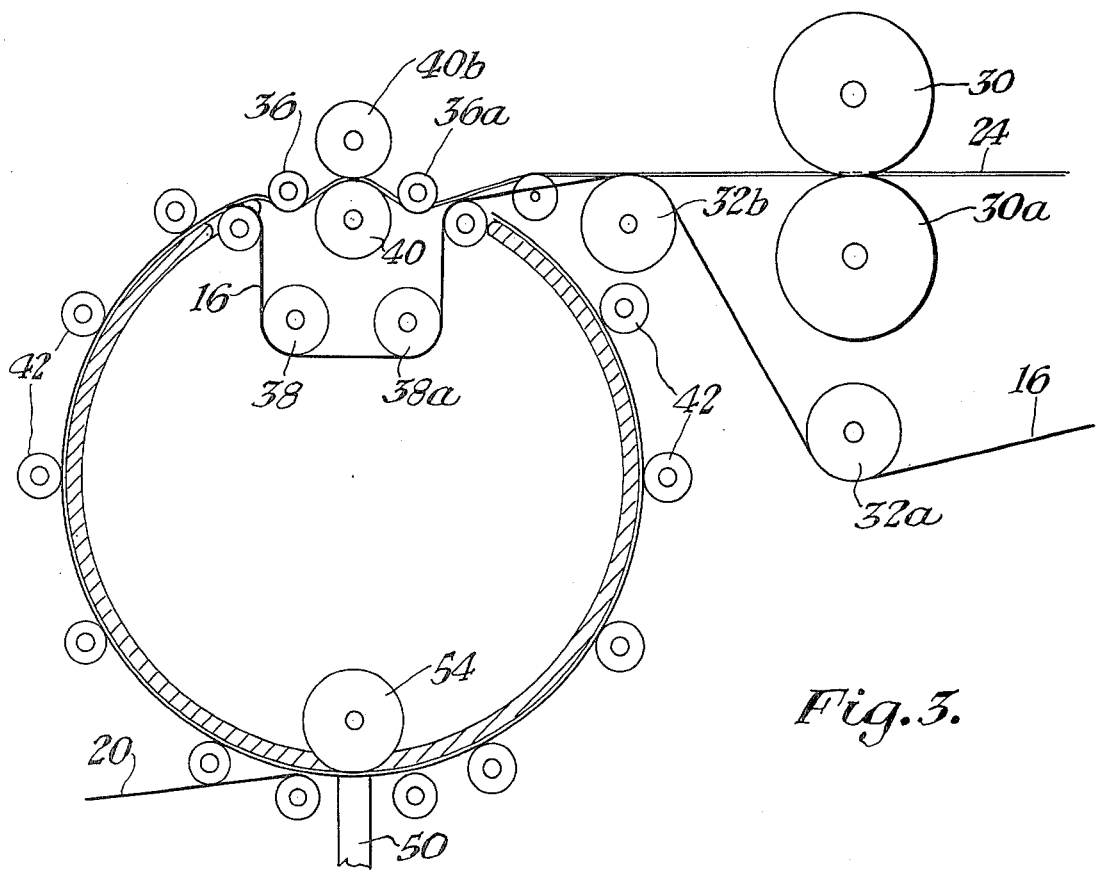
FIG. 3 is a partial front view of the mandrel.

The first strip 16 is fed from a first coil of stripping 14 which is rotatably mounted with a tension device to the frame 12. The strip 16 is fed through a series of pulleys 32, 32a, 32b, through the mandrel by-passing the first driving device 40, around the pulleys 38 and 38a and coming back to the outer surface of the mandrel 34 near the adjustable wire former 36 which imparts a lateral thrust on wire or wires so as wires are under formed. As shown in FIG. 2, the mandrel 34 has a helical groove 64 about its exterior surface, which guides the wire or wires 24 at a mandrel helical angle thereabout angle y in FIG. 11. The mandrel helical angle is less than the helical angle placed in the wire by the the wheel 36 which is illustrated by angle x in FIG. 11. The one or more wires 24 are preformed at a proper helical spiral by adjusting the adjustable wire formers 36a and 36 to the desired helical thrust by use of first and second adjusting wheels 52 and 52a, as shown in FIG. 9. The plurality of guiding rollers 42 or other means are used to retain the formed helically and laterally formed wire as shown at 100 in FIG. 11 or wires to ensure that the wires under the formed force maintain their position within the helical groove 64 of the mandrel, see FIGS. 2, 3 and 11. Angle x shows the wire not under compression as formed is greater than angles y and z. Angle y of the mandrel is less than the angle z which is the wire angle when released from the mandrel. The wire at angle z stretches the skin to its semi-rigid form.

Disposed 180° or any other predetermined distance from the first driving roller 40, is a second driving device 54. A second strip 20 is fed from a rotatably mounted second coil of stripping 18 over a series of pulleys 44, 44a, and over adjacent first strips 16 and over the one or more wires 24, into the second driving device 54. The horn 50 of the ultrasonic welder 46 is adjusted to the proper height by an adjusting means 48 shown in FIG. 1, such that it is in proper relationship with the second driving device 54 to ensure proper welding between the second strip 20 and the adjacent first strip 16 on either side of the wire 24. FIG. 14 shows a horn with a rounded head 100. The body 102 is movable to the left and right for adjustment of pressure. FIG. 15 shows a flat head 104 that has to be moved up and down. The second driving device 54 could be a rotary anvil or jets of air at desired temperatures which may be used to impart a force at the point of the welding surfaces. Any other type of welding device well known in the art may be used to connect the first and second strip or skin.

Now referring to FIGS. 4 through 6, the sequence of operation of the fabricating machine 10 is more clearly illustrated. The first or inner strip 16 is first fed over a series of pulleys 32 through a first longitudinal aperture in the mandrel 34, around the guides 38 and 38a and back up through a second longitudinal aperture adjacent the wire former 36.

The one or more wires 24 are then fed under the first adjustable wire former 36a through the rollers 40a and 40b of the first driving device 40 and then under adjustable series of roller wire formers 36, where the wire or wires are preformed at angle x which may be 10% to 30% of angle y. Then the wire is lined up with the helical groove 64 of the mandrel 34 a lesser angle and forcing a portion of the first or inner strip also into the helical groove. The driving roller 40b can be adjusted to the proper height by use of the third adjusting means or clamp or various other means as shown in FIG. 1. The downward force of the wire or wires 24 allows the first or inner strip 16 to be guided around the mandrel 34 under the wire or wires 24 driven by the first driving device 40. The first or inner strip 16 with the one or more wires 24 on top is then fed about the mandrel 34 until it reaches a second roller anvil driving device 54, where a second or outer strip is fed on top of or lapping the inner strip 16 over the one or more wires 24. As shown in FIG. 6 the second roller anvil driving device 54 feeds the inner strip 16, the one or more wires 24 and the outer strip 20 between the sonatrode or horn 50 of an ultrasonic welder and the anvil 54 which causes the inner strip 16 to be welded to the outer strip 20, enveloping the one or more wires 24 therein, as shown in FIGS. 8 or 8A. As the strip and wires are continually fed in, the process continues and fabricated air duct is fed off the mandrel as shown in FIG. 7. Jets of air or liquids under pressure and temperature may be substituted for the anvil 54, compressing the composite of the wire and strips, so as to suitably mate the surfaces of the strip during welding. It should be noted that the ultrasonic welder after operating for a time, heats and expands welder horn, anvil etc. so that a greater welding pressure is applied to composites of the duct wall being welded resulting in a burn or scorch of strips. To overcome this situation as the temperature stabilizes the welding surface of the horn is made in a preferred arc or half circle, the transducer be permitted to move off center thereby relieves the welding pressure applied to duct wall and anvil.

It should be noted that when starting the process the inner strip 16 with one or more wires 24 must be fed around the mandrel so that there are at least one or more adjacent inner wraps or strip 16, before an outer strip 20 is fed into the second driving means and the ultrasonic welding is begun. Strip 20 is inserted at the spot where there will be an overlap between the wraps of the inner strip 16 and the outer strip 20 so that the seams of the inner strip 16 do not coincide with the seams of the outer strip 20, as shown in FIGS. 8 and 8A.

The helical thrust angle x in FIG. 11 impressed in the wire or wires enveloped between strips insures that they will protrude outwardly and therefore leave the inside of the air ducts substantially smooth, reducing the friction of the air flowing through the duct. The duct is held off the mandrel by air or fluid under pressure from pump 200. The pump is driven by motor 202 that holds air under pressure in tank 204. The air is fed through conduit 206 and through the mandrel as shown at 208 to lift the duct.

Greater helical thrust may be used but may require stronger and/or thicker skin. An alternative is using string fed longitudinally between the skins to provide strength. One such string is illustrated by number 90 in FIG. 11.

INDUSTRIAL APPLICABILITY

The foregoing description of the fabricating process can be used to manufacture a semi-rigid cola passable duct with similar structure involving an inner strip, a lapped outer strip with helical enveloped reinforcement material there between. The strips are conductive to ultrasonic welding of any desired shape, round, oval or substantially rectangular.

What I claim is:

1. A machine for fabricating wire-reinforced duct by welding a flexible first duct wall strip to a flexible second duct wall strip with one or more reinforcement elements therebetween in compression to form a semi-rigid duct, comprising:
   a frame;
   a replaceable mandrel of a given radius and helically grooved at a given pitch;
   a first duct wall strip feeding means for feeding said first duct wall strip onto said mandrel, said first duct wall strip feeding means connected to said frame;
   reinforcement element feeding means for feeding said reinforcement element onto said mandrel over said first duct wall strip, said reinforcement element feeding means connected to said frame;
   a second duct wall strip feeding means for feeding said second duct wall strip onto said mandrel over said first duct wall strip and said reinforcement element, said second duct wall strip feeding means connected to said frame;
   driving means for driving said reinforcement element and said first duct wall strip and said second duct wall strip about said mandrel, said driving means connected to said frame;
   a welding means for welding said first duct wall strip to said second duct wall strip enveloping said reinforcement element in compression therebetween, said welding means connected to said frame;
   a fluid means for floating said duct on said mandrel, said fluid means connected to said frame; and
   said reinforcement element feeding means including adjustable reinforcement element guide means which may be adjusted to shape said reinforcement element with a helical pitch greater than the given pitch and with a radius greater than said given radius.

2. A machine for fabricating duct as set forth in claim 1, further comprising:
   adjusting means for adjusting the angle of said first duct wall strip feeding means and said second duct wall strip feeding means and said reinforcement element relative to said helically grooved mandrel.

3. A machine for fabricating duct as set forth in claim 1, wherein:
   said mandrel is replaceable with other mandrels which are varied in diameter and shape according to the size and application of the duct being manufactured.

4. A machine for fabricating duct as set forth in claim 1, wherein:
   said welding means is an ultrasonic welder.

5. A machine for fabricating duct as set forth in claim 4, wherein:
   said driving means includes a rotary anvil.

6. A machine for fabricating duct as set forth in claim 1; further comprising;
   second driving means displaced substantially 180° about said mandrel from said first driving means.

7. A machine for fabricating wire-reinforced duct as set forth in claim 2, wherein:
   said machine includes a cutting means for cutting said duct into desired lengths.

8. A machine for fabricating duct as set forth in claim 1, further comprising:
   a straightener means for straightening said reinforcement element, connected to said frame.

9. A machine for fabricating wire-reinforced duct as set forth in claim 1, wherein:
   said welding means produces welds with a row near each side of said reinforcement element and near each side of said seam whereby the welds may cover up to 80% of the surface area.

10. A machine for fabricating wire-reinforced duct by welding a first duct wall strip to a second duct wall strip with one or more reinforcement elements therebetween, comprising:
    a frame;
    a helically grooved mandrel, said mandrel removably connected to said frame;
    reinforcement element feeding means for feeding said reinforcement element onto said mandrel, said reinforcement element feeding means connected to said frame;
    a first duct wall strip feeding means for feeding said first duct wall strip onto said mandrel, said first duct wall strip feeding means connected to said frame;
    a second duct wall strip feeding means for feeding said second duct wall strip onto said mandrel, said second duct wall strip feeding means connected to said frame;
    a first driving means for driving said reinforcement element and said first duct wall strip about said mandrel, said first driving means connected to said frame;
    a welding means for welding said first duct wall strip to said second duct wall strip enveloping said reinforcement element therebetween, said welding means connected to said frame;
    a second driving means for moving said reinforcement element, said first duct wall strip and said second duct wall strip over said welding means, said second driving means connected to said frame;
    a motor means for propelling said first driving means and said second driving means, said motor means connected to said frame.

11. A machine for fabricating duct as set forth in claim 10, wherein:
    said welding means is an ultrasonic welder.

* * * * *